Aug. 13, 1940.  E. G. MUELLER  2,211,150
BRAKE RIGGING
Filed April 14, 1939  6 Sheets-Sheet 2

INVENTOR
*Emil G. Mueller.*
BY
HIS ATTORNEY

Fig. 8

Aug. 13, 1940.  E. G. MUELLER  2,211,150
BRAKE RIGGING
Filed April 14, 1939  6 Sheets-Sheet 6

INVENTOR
*Emil G. Mueller.*
BY
HIS ATTORNEY

Patented Aug. 13, 1940

2,211,150

UNITED STATES PATENT OFFICE 2,211,150

BRAKE RIGGING

Emil G. Mueller, Swissvale, Pa., assignor to The American Brake Company, Swissvale, Pa., a corporation of Missouri Application April 14, 1939, Serial No. 267,793

14 Claims. (Cl. 188—56)

My invention relates to brake rigging, and particularly to brake rigging for engine trucks of the type wherein a swing frame or bolster is supported from separate side frames through the medium of suitable springs in such manner that the side frames are free to move relative to the swing frame and to each other.

One object of my invention is the provision in a flexible truck of the type described of a brake rigging of simple and compact form which will permit the necessary relative movement between the parts without undue wear and without interfering with the proper and efficient operation of the brakes.

Another object of my invention is to provide a brake rigging for a four-wheel engine truck of the type described in which a single brake cylinder mounted at the forward end of the truck is utilized to actuate the brake rigging, thereby permitting the weight supported by the truck to be equalized with that supported by the drivers.

Other objects and characteristic features of my invention will become apparent as the description proceeds.

I shall describe two forms of brake rigging embodying my invention, and shall then point out the novel features thereof in claims.

In the accompanying drawings.

Similar reference characters refer to similar parts in each of the several views.

Figure 1:
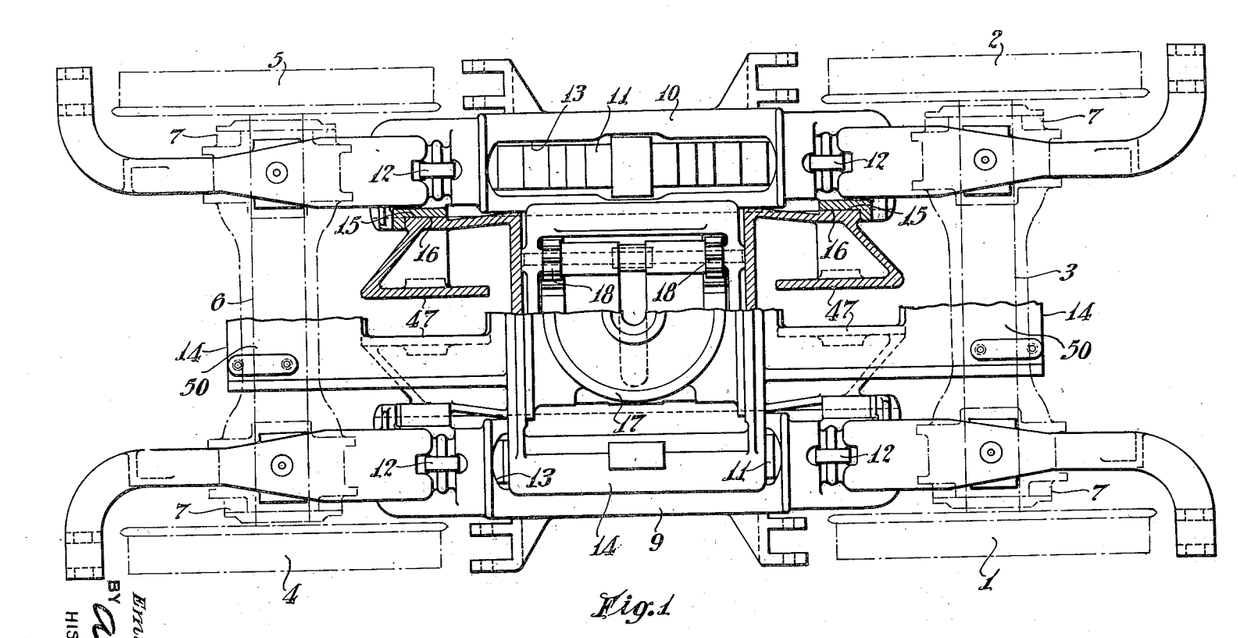
Fig. 1 is a top view of a four-wheel engine truck of the type to which my invention is adapted to be applied, some of the parts being in section to better illustrate the construction.
Figure 2:
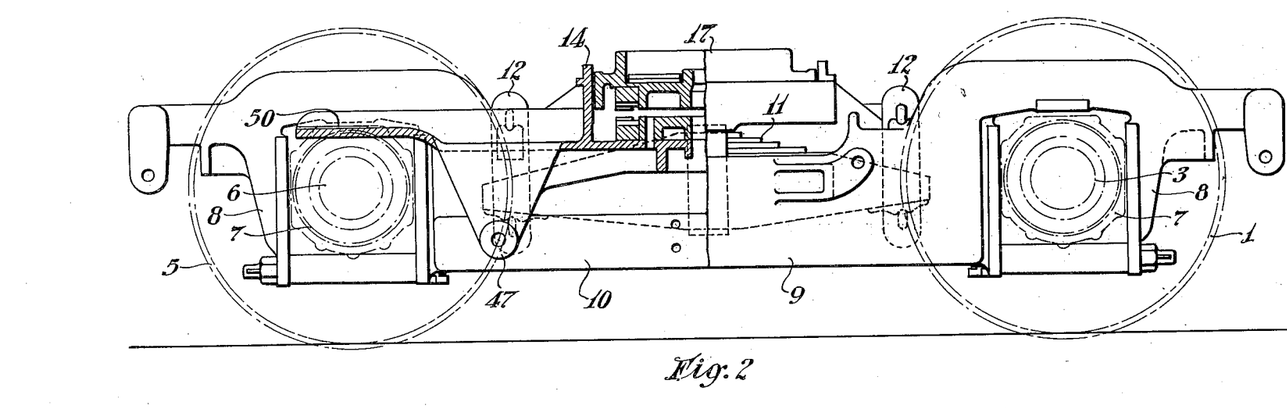
Figs. 2 and 3 are front and right-hand end views, respectively, of the truck shown in Fig. 1 with some of the parts in elevation and the remaining parts in section.
Figure 3:
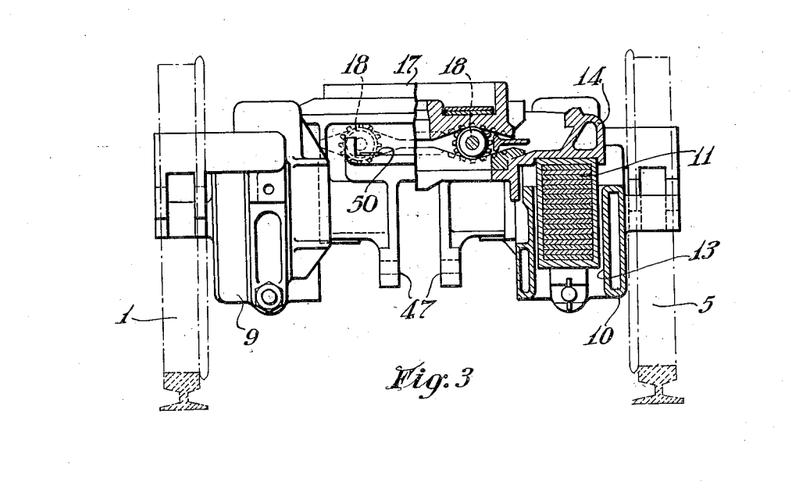

Referring first to Figs. 1, 2 and 3, which as has already been pointed out illustrate an engine truck of the type for which brake rigging embodying my invention is particularly suitable, the truck here shown comprises a front pair of wheels 1 and 2 mounted on an axle 3 and a rear pair of wheels 4 and 5 mounted on an axle 6. The axles 3 and 6 are each provided adjacent the inner side of each wheel with a roller bearing type journal assembly 7, and resting on the two journal assemblies 7 located at the one side of the truck are yokes 8 formed on the opposite ends of a side frame 9, while resting on the other two journal assemblies located at the other side of the truck are other yokes 8 formed on the opposite ends of a side frame 10. A leaf spring 11 is suspended at its ends from each side frame by means of spring hanger links 12, and is guided intermediate its ends for vertical sliding movement relative to the associated side frame by means of a suitable opening 13 which receives the central portion of the spring with some clearance. The two springs 11 support a swing frame 14 which is guided for vertical sliding movement relative to the two side frames by means of suitable cooperating guiding surfaces 15 and 16 formed respectively on the swing frame and the side frames, and the swing frame in turn supports a bolster 17 through the medium of suitable side-sway elimination means 18.

The portion of the truck thus far described is of well-known construction, and for purposes of my present invention it is sufficient to point out, that with this construction the two side frames are free to move independently relative to each other and to the swing frame to enable the wheels to readily follow inequalities in the trackway in a manner which causes a minimum amount of the road shocks to be transmitted to the engine, and insures that the wheels will freely follow the rails at all times.

Referring now to Figs. 4 to 7, inclusive, the brake rigging in the form here shown comprises a plurality of hanger levers 20 one of which is disposed adjacent each side of each of the wheels 1, 2, 4 and 5. These levers are each pivotally attached to the adjacent side frames 9 or 10 by means of pins 21, and are each provided at their lower ends with spaced jaws 22 to form a recess 23. A brake head 24 is pivotally attached to each hanger lever intermediate its ends, and each brake head carries a brake shoe 24a for engagement with the tread of the associated wheel.

Figures 4, 11, 12:
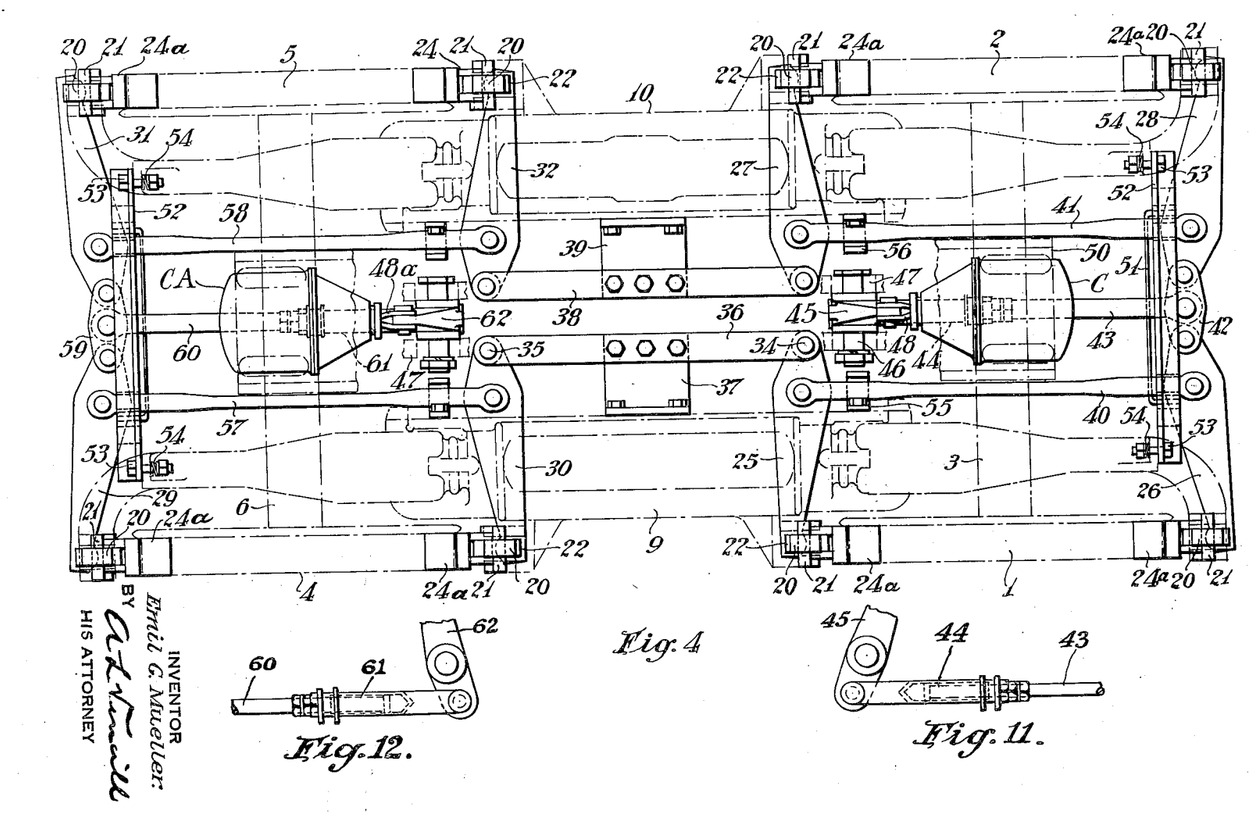
Fig. 4 is a top plan view showing brake rigging embodying my invention applied to the truck shown in the preceding views.
Figs. 11 and 12 are detail views illustrating the manner in which the slack adjusters 44 and 61 shown in plan view in Fig. 4 are connected with the associated brake cylinder levers 45 and 62, respectively.
Figure 5:
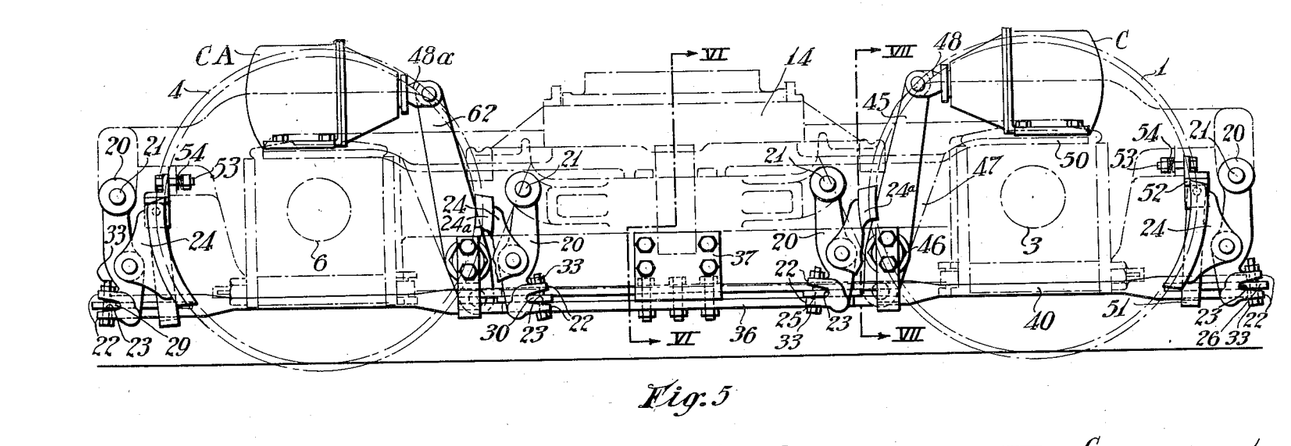
Fig. 5 is a side elevational view of the truck frame and brake rigging as shown in Fig. 4.
Figure 6:
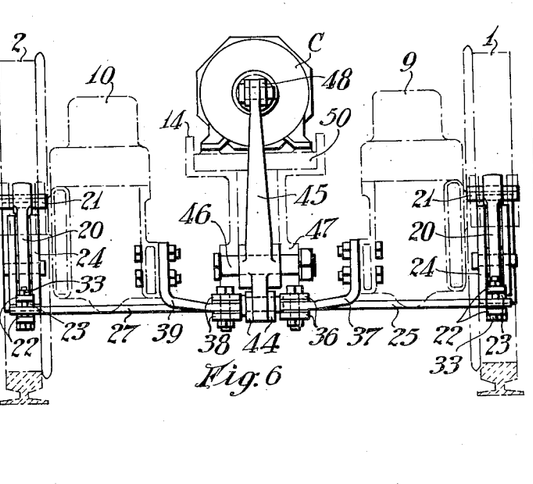
Figs. 6 and 7 are sectional views taken on the lines VI—VI and VII—VII, respectively, of Fig. 5.

The hanger levers 20 are arranged to be moved toward the wheels to effect a brake application by means of four pairs of horizontal laterally extending levers 25 26, 27 28, 29 30 and 31 32, one pair of which is associated with each of the wheels 1, 2, 4 and 5 in the order named, the two levers of each pair being disposed at opposite sides of the associated wheel in such positions that the outer end of each lever extends into the recess 23 in an associated one of the hanger levers. The horizontal levers are supported at their outer ends by the hanger levers, and each horizontal lever is secured to the associated hanger lever by means of a bolt 33 which extends through registering openings formed in the horizontal lever and in the jaw 22 of the hanger lever.

The horizontal lever 25 which is disposed at the rear side of the wheel 1, and the horizontal lever which is disposed at the forward side of the wheel 4 are both dead levers, and these levers are pivotally connected at their inner ends by means of pins 34 and 35 with the opposite ends of a pair of superposed straps 36, which straps, in turn, are secured to the opposite sides of a bracket 37 bolted to the adjacent side frame 9. In a similar manner, the horizontal lever 27 which is disposed at the rear side of the wheel 2 and the horizontal lever 32 which is disposed at the forward side of the wheel 5 are also dead levers, and are pivotally connected at their inner ends to the opposite ends of a pair of superposed straps 38, which latter are secured to the opposite sides of a bracket 39 bolted to the adjacent side frame 10.

The remaining horizontal levers are all live levers, and the two levers 26 and 28 which are disposed at the forward sides of the wheels 1 and 3 are connected intermediate their ends with the levers 25 and 27 by means of pull rods 40 and 41, respectively, and at their inner ends with the opposite end of an equalizer 42.

The equalizer 42 is pivotally connected intermediate its ends with one end of a push rod 43, the opposite end of which is connected through the medium of a slack adjuster 44 of well-known construction with the lower end of a vertical brake cylinder lever 45. The brake cylinder lever 45 is pivotally supported intermediate its ends on a pin 46 mounted in a support 47 formed on the swing frame 14, and is operatively connected at its upper ends with the push rod 48 of a brake cylinder C. The brake cylinder C is bolted to a horizontal supporting member 50 which is provided on the swing frame 14 directly above the front axle 3. The brake cylinder is of the usual type, and includes the usual cylinder portion (not shown), return spring (not shown) and push rod 48 operated by the piston.

The two pull rods 40 and 41 and the push rod 43 are supported adjacent their forward or outer ends by means of a U-shaped supporting member 51 which is pivotally suspended from a crossbar 52. The crossbar 52 extends transversely of the truck at its forward end, and is secured at its opposite ends to the side frames 9 and 10 by means of bolts 53. The holes in the bars through which the bolts 53 pass are made somewhat larger than the shanks of the bolts, and spring washers 54 are provided on the bolt to permit the necessary flexibility between the crossbars and the side frames so as not to interfere with the independent relative movement of the side frames. It will be noted that since the supporting member is pivotally supported in the manner shown, it will not interfere with the necessary and usual movements of the associated push and pull rods.

Supports 55 and 56 are also provided for the push rods 40 and 41 adjacent their inner ends.

Figure 7:
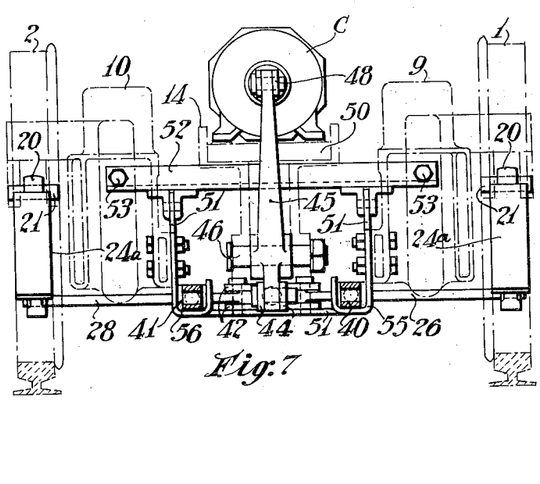

These latter supports are each secured to the adjacent side frame 9 or 10 in the manner shown in Fig. 7.

The levers 29 and 31 which are disposed at the rear sides of the wheels 4 and 5 are connected intermediate their ends with the dead levers 30 and 32, respectively, intermediate their ends by means of pull rods 57 and 58, and are connected at their inner ends with the opposite ends of an equalizer lever 59.

The equalizer 59, in turn, is operatively connected with the push rod 48 of a brake cylinder CA through the medium of a push rod 60, a slack adjuster 61 and a brake cylinder lever 62. The pull rods 57 and 58, the push rod 60, the slack adjuster 61, the brake cylinder lever 62 and the brake cylinder CA are respectively similar to the pull rods 40 and 41, the push rod 43, the slack adjuster 44, the brake cylinder lever 45 and the brake cylinder C, and are supported on the vehicle in the same manner as the parts last named.

With the brake rigging constructed in this manner, when it is desired to apply the brakes, fluid pressure is simultaneously supplied to the two brake cylinders C and CA through the usual air brake control means, thereby causing the pistons of these cylinders to simultaneously move outwardly and simultaneously move the associated push rods 48 and 48a outwardly. The outward movement of the push rod 48 will act through the associated linkage to apply the brakes to the wheels 1 and 2 in an obvious manner, and the outward movement of the push rod 48a will likewise act through the associated linkage to apply the brakes to the wheels 4 and 5.

To release the brakes, the fluid which was previously supplied to the brake cylinders C and CA is vented to atmosphere in the usual manner, thereby permitting the release springs within the brake cylinders to retract the pistons, and hence permitting the various parts of the brake rigging to move to their released positions.

It should be particularly pointed out that with the brake rigging constructed in the manner described, the brake cylinders and brake cylinder levers are supported by the swing frame, while the remaining parts on each side of the vehicle are supported by the associated side frame. It should also be pointed out that the pull and push rods are relatively long and are provided with enough play at each end to permit the intended relative movement between the side frames and the swing frames without interfering with the brake operation.

The brake rigging thus far described is suitable for use when the weight on the engine truck is not equalized with that on the drivers. When the weight on the engine truck is equalized with that on the drivers, the equalizing means does not leave sufficient space for a brake cylinder at the rear end of the truck, and under these conditions I prefer to construct the brake rigging in the manner shown in Figs. 8, 9 and 10.

Figure 8:
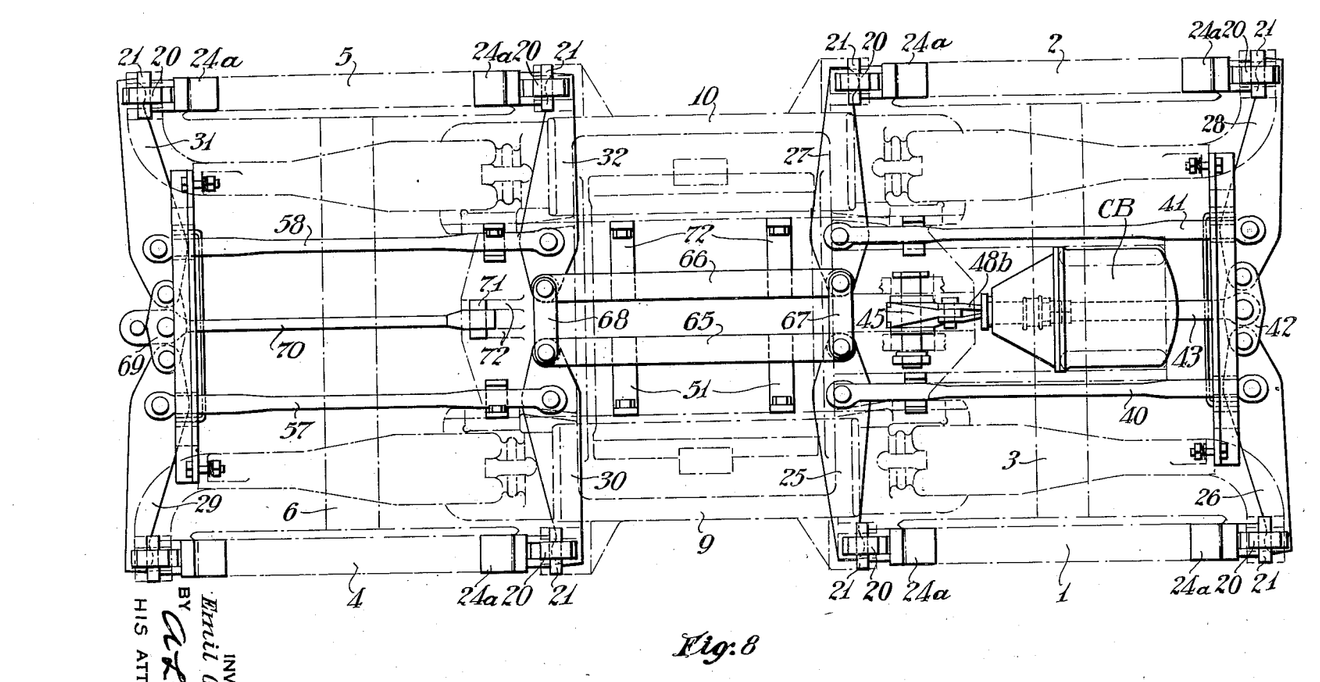
Figs. 8 and 9 are views similar to Figs. 4 and 5 showing a modified form of brake rigging embodying my invention.
Figure 9:
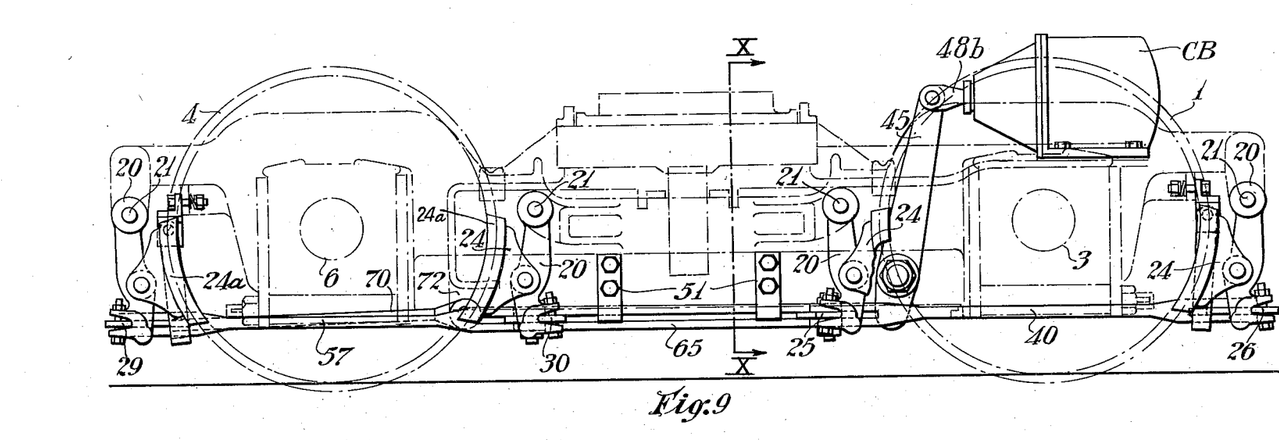
Figure 10:
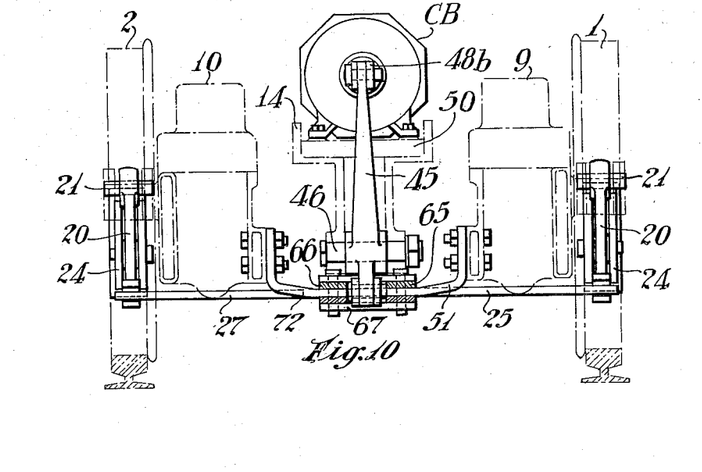
Fig. 10 is a sectional view taken on the line X—X of Fig. 9.

Referring to these figures, as here shown the horizontal levers 25, 27, 30 and 32 are all live levers and the two levers 25 and 30 at the one side of the truck are connected together at their inner ends by a pair of strap pull links 65, while the two levers 27 and 32 at the other side of the truck are likewise connected together at their inner ends by a pair of strap pull links 66. The links 65 are supported adjacent their ends by supports 51 provided on the side frame 9, and serve to support the inner ends of the horizontal levers 25 and 30. Similarly the links 66 are supported adjacent their ends by supports 72 and serve to support the inner ends of the horizontal levers 27 and 32.

The levers 25 and 27 are also connected together at their inner ends by a pair of stabilizing tie links 67, and the levers 30 and 32 are likewise connected together at their inner ends by a pair of stabilizing tie links 68.

The levers 29 and 31 as here shown are dead levers and are connected at their inner ends with the opposite ends of an equalizer 69 which latter, in turn, is connected to one end of a compression rod 70 the other end of which is pivotally attached to the swing frame by means of a pin 71 mounted in suitable lugs 72 formed on the swing frame.

The compression rod 70 is provided to take care of relative movement between the side frames and the swing frame, and must be long enough and low enough down on the truck to relieve any strain which might otherwise be placed on the brake parts.

The remainder of the brake rigging shown in Figs. 8, 9 and 10 is similar to that previously described with the exception that the brake cylinder C has been replaced by a larger brake cylinder CB.

In operation, when fluid under pressure is supplied to the brake cylinder CB, the push rod 48b is forced outwardly in the cylinder, and this outward movement of the push rod acts through the brake cylinder lever 45, push rod 43, equalizer 42, horizontal levers 26 and 28, pull rods 40 and 41, horizontal levers 25 and 27, strap links 65 and 66, horizontal levers 30 and 32 and pull rods 57 and 58 to move the hanger levers 20 toward the wheels, and thus force the brake shoes 24a into frictional engagement with the wheels in a manner to provide an equalized braking force on each side of each wheel.

To release the brakes, the fluid which was supplied to the brake cylinder CB to apply the brakes is vented from the brake cylinder in the usual manner, whereupon the release spring disposed within the brake cylinder acts to move the hanger levers and hence the brake shoes to their release positions.

Although I have herein shown and described only two forms of brake rigging embodying my invention, it is understood that various changes and modifications may be made therein within the scope of the appended claims without departing from the spirit and scope of my invention.

Having thus described my invention, what I claim is:

1. In a brake rigging for a truck having independently movable side frames and a swing frame resiliently supported by said side frames, the combination, of a pair of horizontally extending operatively connected levers associated with each wheel of one pair of wheels and supported by the adjacent side frame, the two levers of each pair being operatively connected at their outer ends with brake shoes for frictionally engaging the associated wheel, a brake cylinder supported by said swing frame, and means for operatively connecting said cylinder with said horizontal levers.

2. In a brake rigging for a four-wheel engine truck having independently movable side frames and a load-carrying member resiliently supported thereon, operatively connected pairs of laterally extending horizontal levers associated with said wheels and connected with means for applying clasp brakes to the associated wheels, means for supporting each pair of levers from the associated side frame, and means mounted on said load carrying member and operatively connected with said levers for actuating said levers to effect a brake application.

3. In a brake rigging for a truck having independently movable side frames supported by a plurality of pairs of wheels and a load-carrying member resiliently supported by said side frames, the combination of a horizontal laterally extending lever disposed on each side of each wheel and supportingly connected at its outer end with a hanger lever suspended from the contiguous side frame, each said hanger lever being provided with a brake shoe for cooperation with the associated wheel, means for pivotally attaching the inner end of the lever on one side of each wheel to a fixed support secured to the associated side frame, means for operatively connecting the two levers on opposite sides of each wheel together intermediate their ends, means for pivotally connecting the inner end of the lever on the other side of each wheel with one end of an equalizer lever the other end of which is connected with the corresponding lever at the opposite side of the truck, a brake cylinder for each pair of wheels mounted on said load-carrying member, and means for operatively connecting each brake cylinder lever with the equalizer associated with the same pair of wheels.

4. In a brake rigging for a truck having independently movable side frames supported by a plurality of pairs of wheels and a load-carrying member resiliently supported by said side frames, the combination of a horizontal laterally extending lever disposed on each side of each wheel and supportingly connected at its outer end with a hanger lever suspended from the contiguous side frame, each said hanger lever being provided with a brake shoe for cooperation with the associated wheel, means for pivotally attaching the inner end of the lever on one side of each wheel to a fixed support secured to the associated side frame, means for operatively connecting the two levers on opposite sides of each wheel together intermediate their ends, means for pivotally connecting the inner end of the lever on the other side of each wheel with one end of an equalizer lever the other end of which is connected with the corresponding lever at the opposite side of the truck, a brake cylinder for each pair of wheels mounted on said load-carrying member, and means including a brake cylinder lever pivotally attached to said load-carrying member for operatively connecting each brake cylinder lever with the equalizer associated with the same pair of wheels.

5. In a brake rigging for a truck having independently movable side frames supported by a plurality of pairs of wheels and a load-carrying member resiliently supported by said side frames, the combination of a horizontal laterally extending lever disposed on each side of each wheel and supportingly connected at its outer end with a hanger lever suspended from the contiguous side frame, each said hanger lever being provided with a brake shoe for cooperation with the associated wheel, means for pivotally attaching the inner end of the lever on one side of each wheel to a fixed support secured to the associated side frame, means for operatively connecting the two levers on opposite sides of each wheel together intermediate their ends, means for pivotally connecting the inner end of the lever on the other side of each wheel with one end of an equalizer lever the other end of which is connected with the corresponding lever at the opposite side of the truck, a brake cylinder for each pair of wheels mounted on said load-carrying member, a brake cylinder lever for each brake cylinder pivotally mounted on said load-carrying member, and a push rod connecting each brake cylinder lever with the associated equalizer.

6. In a four-wheel engine truck having independently movable side frames and a swing frame which is resiliently supported by said side frames, the combination with one pair of wheels of said truck of two horizontal laterally extending levers associated with each wheel of said pair and one disposed on each side of the associated wheel, each said lever being supportingly connected at its outer end with the lower end of a hanger lever which is suspended from the associated side frame, brake shoes, secured to said hanger levers intermediate their ends for frictionally engaging the associated wheel, means connecting the two levers of each pair together intermediate their ends, means for pivotally supporting the inner end of the one lever of each pair from the associated side frame, an equalizer connected at its opposite ends with the other lever of each pair, a brake cylinder secured to said swing frame, and means connecting said brake cylinder with said equalizer.

7. In a truck having a plurality of pairs of wheels, independently movable side frames supported by said wheels, a swing frame resiliently supported from said side frames, the combination of a pair of horizontally laterally extending levers associated with each wheel of one pair of wheels, the two levers of each pair being disposed on opposite sides of the associated wheel and being supportingly connected at their outer ends with hanger levers suspended from the associated side frame, each said hanger lever being provided intermediate its ends with a brake shoe for cooperation with the associated wheel, means for pivotally attaching the inner end of one lever of each pair to a supporting strap secured to the associated side frame, an equalizer lever connected at its opposite ends with the other lever of each pair, two pull rods one connecting the two levers of each pair together intermediate their ends, a push rod connected with said equalizer intermediate its ends, and means for supporting said push and pull rods at one end comprising a U-shaped member pivotally suspended from a crossbar extending transversely of the truck and flexibly connected at its ends with said side frame.

8. In a brake rigging for an engine truck having two pairs of wheels, independently movable side frames supported by said wheels and a load-carrying member resiliently supported by said side frames, the combination of a pair of horizontal laterally extending levers associated with each wheel, the two levers of each pair being disposed on opposite sides of the wheel and being operatively connected at their outer ends with brake shoes for frictionally engaging the associated wheel, means for supporting each pair of levers from the associated side frame, a brake cylinder mounted on said load-carrying member, and means for connecting said brake cylinder with all of said levers in a manner which permits relative movement of the truck parts without strain on the brake parts.

9. In a brake rigging for an engine truck having two pairs of wheels, independently movable side frames supported by said wheels, and a load-carrying member resiliently supported by said side frames, the combination of a pair of horizontal laterally extending levers associated with each wheel, the two levers of each pair being disposed on opposite sides of the wheel and being operatively connected at their outer ends with brake shoes for frictionally engaging the associated wheel, means for supporting each pair of levers from the associated side frame, two brake cylinders one secured to the load-carrying member at each end of the truck, means for operatively connecting the brake cylinder at the forward end of the truck with the four levers associated with the forward pair of wheels, and means for operatively connecting the brake cylinder disposed at the rear end of the truck with the four levers associated with the rear pair of wheels.

10. In a brake rigging for a four-wheel engine truck having independently movable side frames supported by said wheels and a load-carrying member resiliently supported by said side frames, the combination of a pair of horizontal laterally extending levers associated with each wheel, the two levers of each pair being disposed on opposite sides of the associated wheel and being supportingly connected at their outer ends with hangers suspended from the associated side frame and carrying brake shoes for cooperation with the associated wheel, the two levers which are disposed at the forward sides of the forward pair of wheels being pivotally attached at their inner ends to the opposite ends of a first equalizer and the two levers which are disposed at the rear sides of the rear pair of wheels being pivotally attached at their inner ends to the opposite ends of a second equalizer, a first pair of straps secured to the one side frame and pivotally supporting at their opposite ends the inner ends of the two horizontal levers which are disposed between the two wheels at the same side of the vehicle, a second pair of straps secured to the other side frame and pivotally supporting at their opposite ends the inner ends of the two horizontal levers which are disposed between the two wheels at the same side of the vehicle, a pull rod connecting the two levers at the opposite side of each wheel intermediate their ends, two brake cylinders secured to said load-carrying member, one at each end of the vehicle, two brake cylinder levers pivotally supported intermediate their ends by said load-carrying member and each connected at its upper end with a different one of said brake cylinders and at its lower end with a different one of said equalizers.

11. In a brake rigging for a four-wheel engine truck having independently movable side frames supported by said wheels and a load-carrying member resiliently supported by said side frames, the combination of a pair of horizontal laterally extending levers associated with each wheel, the two levers of each pair being disposed on opposite sides of the associated wheel and being supportingly connected at their outer ends with hangers suspended from the associated side frame, each said hanger being provided with a brake shoe for cooperation with the associated wheel, the two levers which are disposed at the forward sides of the forward pair of wheels being pivotally attached at their inner ends to the opposite ends of a first equalizer and the two levers which are disposed at the rear sides of the rear pair of wheels being pivotally attached at their inner ends to the opposite ends of a second equalizer, a first pair of straps supported by the one side frame and pivotally supporting at their opposite ends the inner ends of the two horizontal levers which are disposed between the two wheels at the same side of the vehicle, a second pair of straps supported by the other side frame and pivotally supporting at their opposite ends the inner ends of the two horizontal levers which are disposed between the two wheels at the same side of the vehicle, a pull rod connecting the two levers at the opposite side of each wheel intermediate their ends, two brake cylinders secured to said load-carrying member, one at each end of the vehicle, two brake cylinder levers pivotally supported intermediate their ends by said load-carrying member and each connected at its upper end with a different one of said brake cylinders, a push rod connecting the lower end of each brake cylinder lever with the equalizer lever at the same end of the truck, two crossbars one at each end of the truck secured at their opposite ends to the side frames in a manner which permits the intended movement of the side frames, and a supporting member at each end of the truck extending under the adjacent push and pull rods and suspended from the associated crossbar.

12. In a brake rigging for a four-wheel engine truck having independently movable side frames supported by said wheels and a load-carrying member resiliently supported by said side frames, the combination of a pair of horizontal laterally extending levers associated with each wheel, the two levers of each pair being disposed on opposite sides of the associated wheel and being supportingly connected at their outer ends with hangers suspended from the associated side frame, each said hanger being provided with a brake shoe for cooperation with the associated wheel, the two levers which are disposed at the forward sides of the forward pair of wheels being pivotally attached at their inner ends to the opposite ends of a first equalizer and the two levers which are disposed at the rear sides of the rear pair of wheels being pivotally attached at their inner ends to the opposite ends of a second equalizer, a first pair of pull links connecting the inner ends of the two levers which are disposed between the wheels at one side of the vehicle, a second pair of pull links connecting the inner ends of the two levers which are disposed between the wheels at the other side of the vehicle, each said pair of pull links being slidably supported on supports secured to the adjacent side frame and serving to support the inner ends of the levers connected therewith, stabilizing tie links connecting the inner ends of the horizontal levers disposed at the rear side of the forward pair of wheels, other stabilizing tie links connecting the inner ends of the horizontal levers disposed at the forward sides of the rear pair of wheels, a pull rod connecting the two levers at the opposite sides of each wheel intermediate their ends, a compression rod connected at one end to the second equalizer intermediate its ends and connected at the opposite end to said load-carrying member, a brake cylinder secured to said load-carrying member at the forward end of the truck, and means connecting said brake cylinder with said first equalizer.

13. In a brake rigging for a four-wheel engine truck having independently movable side frames supported by said wheels and a load-carrying member resiliently supported by said side frames, the combination of a pair of horizontal laterally extending levers associated with each wheel, the two levers of each pair being disposed on opposite sides of the associated wheel and being supportingly connected at their outer ends with hangers suspended from the associated side frame, each said hanger being provided with a brake shoe for cooperation with the associated wheel, the two levers which are disposed at the forward sides of the forward pair of wheels being pivotally attached at their inner ends to the opposite ends of a first equalizer and the two levers which are disposed at the rear sides of the rear pair of wheels being pivotally attached at their inner ends to the opposite ends of a second equalizer, a first pair of pull links connecting the inner ends of the two levers which are disposed between the wheels at one side of the vehicle, a second pair of pull links connecting the inner ends of the two levers which are disposed between the wheels at the other side of the vehicle, each said pair of pull links being slidably supported on supports secured to the adjacent side frame and serving to support the inner ends of the levers connected therewith, stabilizing tie links connecting the inner ends of the horizontal levers disposed at the rear side of the forward pair of wheels, other stabilizing tie links connecting the inner ends of the horizontal levers disposed at the forward sides of the rear pair of wheels, a pull rod connecting the two levers at the opposite sides of each wheel intermediate their ends, a compression rod connected at one end to the second equalizer intermediate its ends and connected at the opposite end to said load-carrying member, a brake cylinder secured to said load-carrying member at the forward end of the truck, means connecting said brake cylinder with said first equalizer, two crossbars one at each end of the truck flexibly attached at their ends to said side frames, and means for supporting the contiguous ends of the adjacent rod suspended from said crossbars.

14. In a brake rigging for a four-wheel engine truck having independently movable side frames and a load-carrying member resiliently supported therein, brake elements for applying clasp brakes to each wheel including a horizontally extending pull rod, a horizontally extending push rod connected with certain ones of said elements for actuating them, and means for supporting one end of said push and pull rods including a crossbar movably secured at its ends to said side frames and carrying intermediate its ends a hinged member upon which said rods rest.

EMIL G. MUELLER.